United States Patent

(12) United States Patent
Kuscher et al.

(10) Patent No.: US 9,268,457 B2
(45) Date of Patent: Feb. 23, 2016

(54) TOUCH-BASED FLUID WINDOW MANAGEMENT

(75) Inventors: Alexander Friedrich Kuscher, San Francisco, CA (US); John Nicholas Jitkoff, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 389 days.

(21) Appl. No.: 13/549,336

(22) Filed: Jul. 13, 2012

(65) Prior Publication Data

US 2015/0205446 A1 Jul. 23, 2015

(51) Int. Cl.
*G06F 3/0481* (2013.01)
*G06F 3/0484* (2013.01)
*G06F 3/0488* (2013.01)
*G06F 9/44* (2006.01)

(52) U.S. Cl.
CPC .......... *G06F 3/0481* (2013.01); *G06F 3/04845* (2013.01); *G06F 3/04883* (2013.01); *G06F 9/4443* (2013.01); *G06F 2203/04808* (2013.01)

(58) Field of Classification Search
CPC ............................. G06F 3/0481; G06F 9/4443
USPC ........................................................ 715/800
See application file for complete search history.

(56) References Cited

U.S. PATENT DOCUMENTS

| | | | |
|---|---|---|---|
| 7,469,381 B2 | 12/2008 | Ording | |
| 2002/0054133 A1* | 5/2002 | Jameson | 345/788 |
| 2002/0191026 A1* | 12/2002 | Rodden | G09G 5/14 |
| | | | 715/779 |
| 2003/0107604 A1* | 6/2003 | Ording | 345/788 |
| 2006/0080621 A1* | 4/2006 | Park | G06F 3/04883 |
| | | | 715/788 |
| 2006/0125803 A1 | 6/2006 | Westerman et al. | |
| 2007/0109323 A1* | 5/2007 | Nakashima | 345/661 |
| 2007/0229556 A1* | 10/2007 | Kim | G06F 3/0489 |
| | | | 345/698 |
| 2008/0005692 A1* | 1/2008 | Hoblit | G06F 3/048 |
| | | | 715/781 |
| 2008/0042979 A1 | 2/2008 | Nikbin | |
| 2008/0316183 A1 | 12/2008 | Westerman et al. | |
| 2009/0073194 A1 | 3/2009 | Ording | |
| 2009/0077488 A1 | 3/2009 | Ording | |
| 2009/0174675 A1* | 7/2009 | Gillespie | G06F 3/0416 |
| | | | 345/173 |
| 2009/0303231 A1 | 12/2009 | Robinet et al. | |
| 2010/0085318 A1* | 4/2010 | Lee | G06F 3/04883 |
| | | | 345/173 |
| 2010/0107118 A1* | 4/2010 | Pearce | G06F 3/0481 |
| | | | 715/799 |
| 2010/0156804 A1 | 6/2010 | Young | |
| 2010/0313125 A1 | 12/2010 | Fleizach et al. | |

(Continued)

OTHER PUBLICATIONS

Multi-Finger and Whole Hand Gestural Interaction Techniques for Multi-User Tabletop Displays Mike Wu et. al ACM 2003.*

(Continued)

*Primary Examiner* — William Bashore
*Assistant Examiner* — Nathan Shrewsbury
(74) *Attorney, Agent, or Firm* — McDermott Will & Emery LLP

(57) ABSTRACT

A computer-implemented method for tiling a window, the method comprising presenting a window of a first size in a display area of a touch-based display and receiving, via the touch-based display, a first user input indicating a selection of the window, wherein the first user input comprises an indication that the user has initiated contact with the touch-based display at a plurality of contact points. In certain aspects, the method further comprises steps for receiving, via the touch-based display, a second user input indicating a first movement of the window in a direction of a first edge of the display area and in response to the second user input and resizing a first edge of the window. Systems and computer-readable media are also provided.

21 Claims, 8 Drawing Sheets

(56) References Cited

U.S. PATENT DOCUMENTS

| | | |
|---|---|---|
| 2011/0074699 A1 | 3/2011 | Marr et al. |
| 2011/0154268 A1* | 6/2011 | Trent et al. ............... 715/863 |
| 2011/0157029 A1 | 6/2011 | Tseng |
| 2011/0185316 A1* | 7/2011 | Reid ............... G06F 3/04883 715/863 |
| 2012/0054671 A1* | 3/2012 | Thompson et al. ........... 715/784 |
| 2012/0144339 A1* | 6/2012 | Huang ............... G06F 3/0483 715/776 |
| 2012/0179969 A1* | 7/2012 | Lee et al. ............... 715/719 |
| 2012/0293440 A1* | 11/2012 | Hotelling et al. ........... 345/173 |
| 2012/0297336 A1* | 11/2012 | Lin et al. ............... 715/800 |
| 2012/0304106 A1* | 11/2012 | LeVee et al. ............... 715/781 |
| 2013/0082928 A1* | 4/2013 | Kim et al. ............... 345/168 |
| 2013/0086508 A1* | 4/2013 | Oguz ............... 715/779 |
| 2013/0285933 A1* | 10/2013 | Sim et al. ............... 345/173 |
| 2013/0321340 A1* | 12/2013 | Seo et al. ............... 345/174 |

OTHER PUBLICATIONS

Exploring New Window Manipulation Techniques—David Ahlstrom (Nov. 23, 2009).*

* cited by examiner

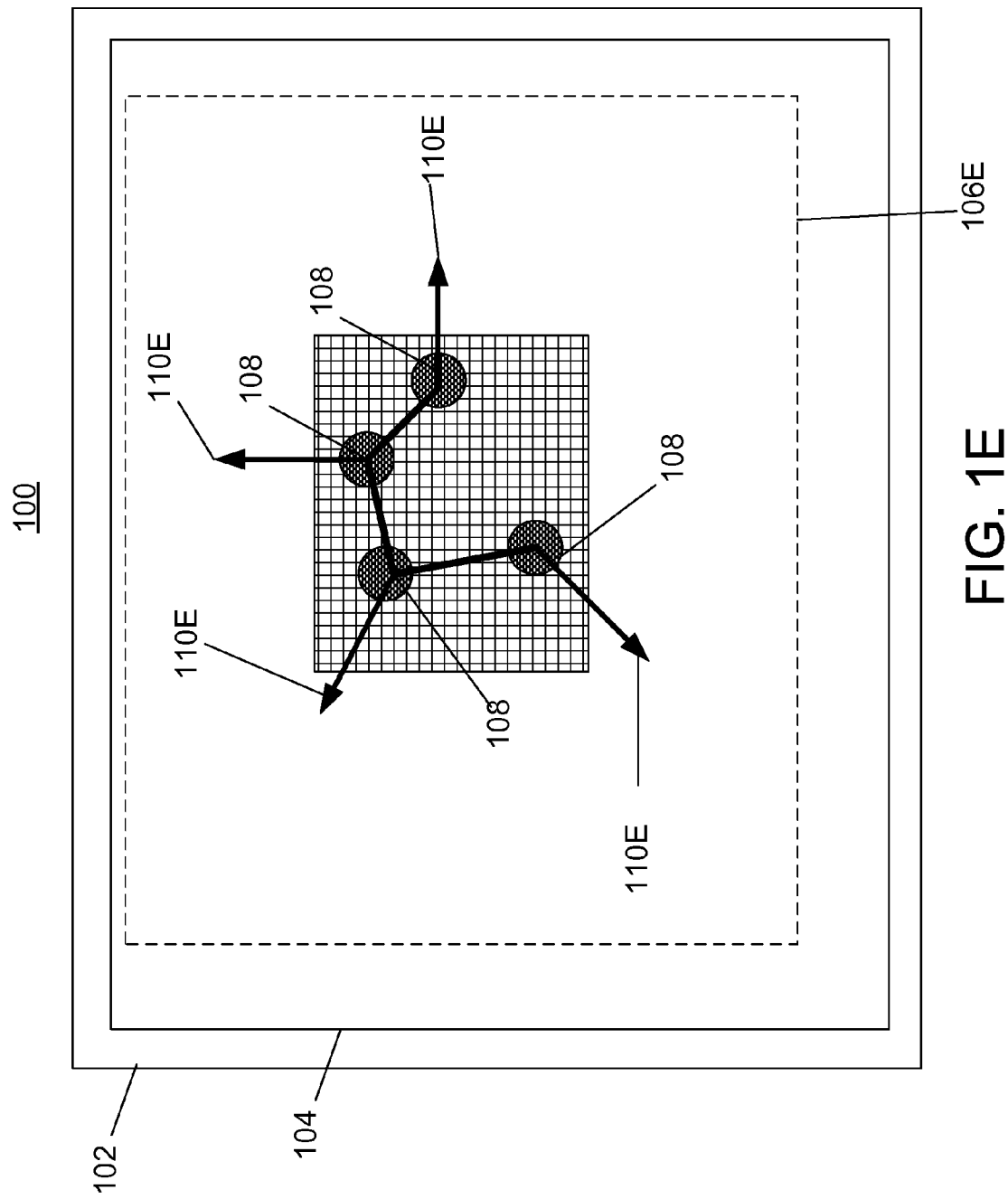

TOUCH-BASED FLUID WINDOW MANAGEMENT

BACKGROUND

The subject technology relates to a user interface for managing windows and particularly, to a window manager for managing the display of one or more windows on a touchscreen based device.

SUMMARY

The disclosed subject matter relates to a computer-implemented method for tiling a window, the method comprising, presenting a window of a first size in a display area of a touch-based display and receiving, via the touch-based display, a first user input indicating a selection of the window, wherein the first user input comprises an indication that the user has initiated contact with the touch-based display at a plurality of contact points. In certain aspects, the method further comprises steps for receiving, via the touch-based display, a second user input indicating a first movement of the window in a direction of a first edge of the display area and in response to the second user input, resizing a first edge of the window.

The disclosed subject matter also relates to a system for tiling a window, the system comprising one or more processors, a touch-based display coupled to the one or more processors and a computer-readable medium comprising instructions stored therein, which when executed by the processors, cause the processors to perform operations comprising, presenting a window of a first size in a display area of a touch-based display and receiving, via the touch-based display, a first user input indicating a selection of the window, wherein the first user input comprises an indication that the user has initiated contact with the touch-based display at a plurality of contact points. In certain aspects, the processors are further configured to perform operations for receiving, via the touch-based display, a second user input indicating a first movement of the window in a direction of a first edge of the display area and in response to the second user input, resizing a first edge of the window.

In another implementation, the subject disclosure comprises a computer-readable medium comprising instructions stored therein, which when executed by a processor, cause the processor to perform operations comprising, presenting a window of a first size in a display area of a touch-based display, receiving, via the touch-based display, a first user input indicating a selection of the window, wherein the first user input comprises an indication that the user has initiated contact with the touch-based display at a plurality of contact points, receiving, via the touch-based display, a second user input indicating a first movement of the window in a direction of a first edge of the display area and in response to the second user input, resizing a first edge of the window.

In another implementation the subject disclosure provides a computer-readable medium comprising instructions stored therein, which when executed by a processor, cause the processor to perform operations comprising, presenting a window of a first size in a display area of a touch-based display, receiving, via the touch-based display, a first user input indicating a selection of the window, wherein the first user input comprises an indication that the user has initiated contact with the touch-based display at a plurality of contact points, receiving, via the touch-based display, a user gesture and tiling the window based on a direction and a speed of the user gesture.

The disclosed subject matter also relates to a computer-readable medium comprising instructions stored therein, which when executed by a processor, cause the processor to perform operations comprising, presenting a window of a first size in a display area of a touch-based display, receiving, via the touch-based display, a first user input indicating a selection of the window, wherein the first user input comprises an indication that the user has initiated contact with the touch-based display at a plurality of contact points, receiving, via the touch-based display, a second user input indicating a first movement of the window in a direction of a first edge of the display area and minimizing the window in response to the second user input.

In yet another aspect, the subject disclosure provides for a computer-readable medium comprising instructions stored therein, which when executed by a processor, cause the processor to perform operations comprising, presenting a plurality of windows in a display area of a touch-based display, receiving, via the touch-based display, a first user input indicating a selection of a first window, wherein the first user input comprises an indication that the user has initiated contact with the touch-based display at a plurality of contact points, receiving, via the touch-based display, a second user input indicating a first movement of the first window in a direction of a first edge of the display area and maximizing the first window in response to the second user input.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative, and not restrictive in nature.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the disclosed aspects. In the drawings:

FIGS. 1A-1E illustrate examples of a computing-device, including a window manager, that can be used to implement aspects of the subject disclosure.

DETAILED DESCRIPTION

Figure 1A:
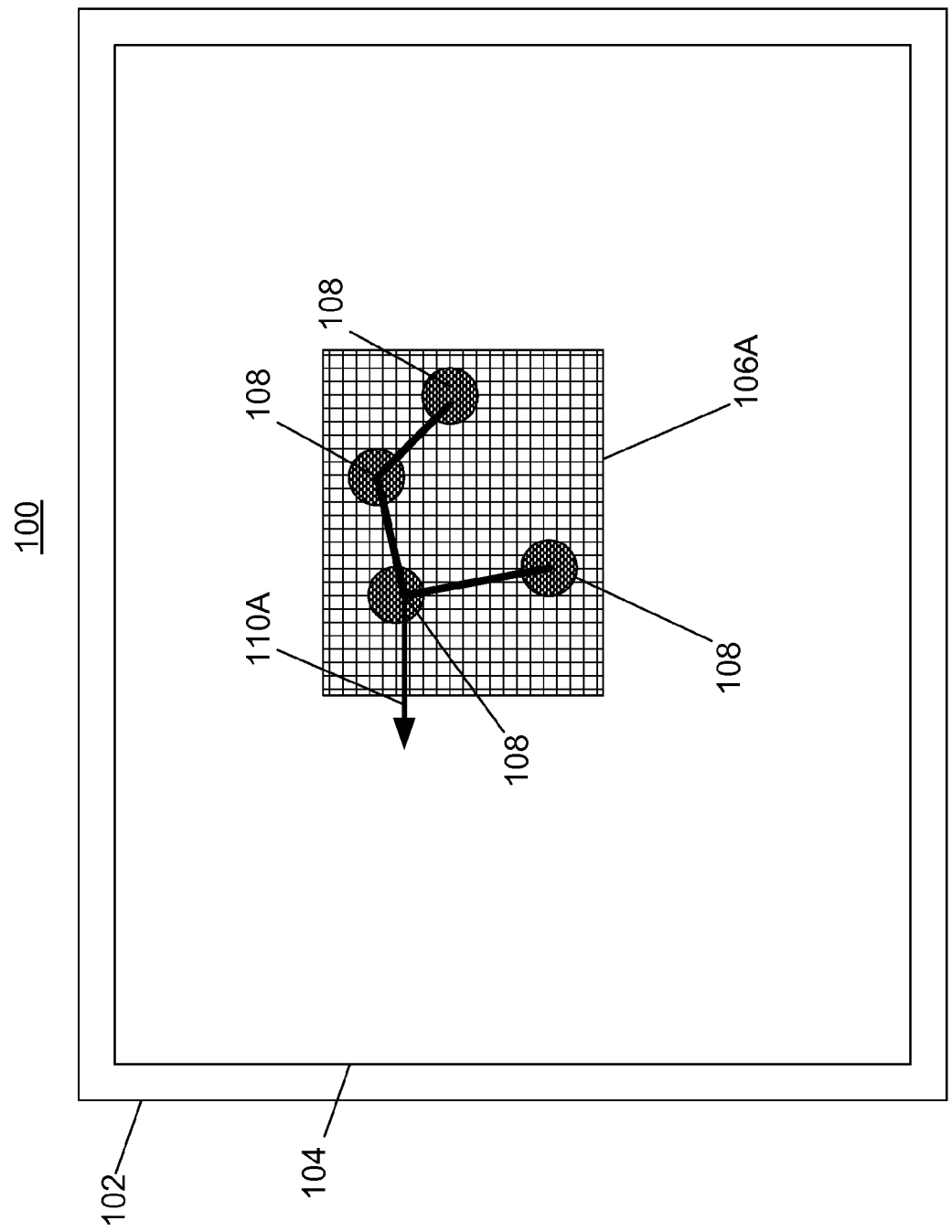

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Aspects of the subject technology provide system software and methods for presenting and controlling the appearance of one or more windows in a graphical user interface (GUI) based on input received from a touch-based display device. In certain aspects, methods of the subject disclosure can be used to affect the sizing, placement and behavior of one or more windows, for example, within a display area provided by the graphical user interface.

More specifically, a window manager of the subject technology is configured to receive multi-touch gestures from the user and to resize or "tile" a window in response to the gestures. In one implementation, a multi-touch gesture can be received when the user contacts a touch-based display (e.g., of a computing device) at a plurality of contact points. Depending on implementation, the user's gesture may comprise either by the user with a single hand, or with multiple hands. Based on the user's contact, the user's gestures can be interpreted (e.g., by the window manager) and used to control various aspects of window display and placement.

In one implementation, a user's engagement with a touch-based display can cause one or more windows (e.g., from among a plurality of windows), to be resized. For example, a selected window can be resized based on the direction of a gesture performed by the user. For example, if a user selects a particular window and moves the window toward a first edge of a display area (e.g., the screen area) the window can be resized, for example, by increasing or decreasing (e.g., expanding or contracting) the window area along a first edge of the window. In some implementations, the window edge that is expanded/contracted will correspond to the direction in which the user gesture is performed. For example, if the user selects a particular window and makes a gesture to the left (e.g., by flicking his fingers to the left), a left edge of the window can be expanded to increase the window's total area.

The user's engagement with the touch-based display can cause one or more windows, (e.g., selected from among a plurality of windows), to be maximized or minimized in size. In certain aspects, a gesture provided by the user will be interpreted based on a speed and a direction of the gesture. By way of example, the user can select a particular window (e.g., by touching the touch-based display using four fingers). Subsequently, the user may gesture in an upward direction on the display area to move the selected window toward a top of the screen. As a result, the window may be maximized in size, or may be tiled to a particular predetermined size. In another example, if the user makes a gesture in a downward direction (e.g., toward a bottom of the screen), the window may be minimized or collapsed in size.

In certain implementations, a speed of the user's gesture can be interpreted (e.g., by a window manager) to affect the behavior of one or more windows. For example, if a user selects a particular window (e.g., via a multi-touch action with respect to the touch-based display) and makes a slow gesture (e.g., in an upward direction), the window may slowly slide in the direction of the user's gesture. However, if a user selects a particular window and subsequently provides high-speed gesture, the window may move with great speed for example and/or may be made to re-size based on the speed of the user's gesture.

Placement of a selected window, either due to re-positioning or re-sizing, can be performed with respect to a grid that is overlaid upon a display area of the GUI. For example, tiling and/or resizing of a selected window may be performed such that one or more edge of the selected window are made to align with one or more grid contours before the selected window is "snapped" or fixed to the grid.

FIG. 1A illustrates an example of a computing device 100 including a window manager (not shown) that can be used to control the placement and display of one or more windows. Specifically, the computing device 100 comprises an enclosure 102, a touch-based display 104 and a window 106A. A plurality of contact points 108A are further illustrated in FIG. 1A, indicating locations on the touch-based display 104 with which the user is in contact. A direction of a gesture 110A of the user is also illustrated, with respect to the plurality of contact points 108.

Although the computing device 100 is illustrated as a tablet based device, the computing device 100 can comprise any type of computing device capable of supporting and receiving input from a touch-based display. By way of example, the computing device 100 can comprise any electronic device that includes a touch-based display. By way of example, the computing device 100 could be a personal computer (e.g., a laptop, netbook or tablet computing device), or smart phone, etc.

Additionally, the plurality of contact points 108 can include an interaction between a user and the touch-based display 104, with one or more fingers of the user, on one or more hands. Thus, the user may interact with the computing device 100 using either a single hand or two hands.

The computing device 100, comprising a window manager (not shown), can display one or more windows on the touch-based display 104. Via interaction with the touch-based display 104, a user can indicate selection of a particular window (e.g., the window 106A), from among one or more windows displayed in the display area provided on the touch-based display 104. In certain aspects, selection of the window 106A will be triggered by the user's multi-touch interaction with the touch-based display 104. That is, selection of the window 106A for repositioning, resizing or retiling can be triggered by the user's engagement with the touch-based display 104 at a minimum number of discrete contact points. As illustrated in the example of FIG. 1A, the user's engagement with touch-based display 104 occurs at four contact points (e.g., contact points 108), however a fewer number (or greater number) of contact points may be required. Based on the user's multi-touch interaction with touch-based display 104, a gesture performed by the user will be interpreted (e.g., by the window manager) to change the display of the window 106A.

In certain aspects, a gesture by the user (e.g., the gesture 110A in a left direction on the touch-based display 104), can cause the window 106A to increase in area, for example, by expanding the area of window 106A in a left direction on display 104. In some implementations, an edge of the window 106A that will be expanded (or contracted) will correspond with the direction of the gesture received from the user. Accordingly, in the example of FIG. 1A, the gesture 110A may cause the left-most edge of the window 106A to be increased in size, thereby increasing the total area of the window 106A.

Figure 1B:
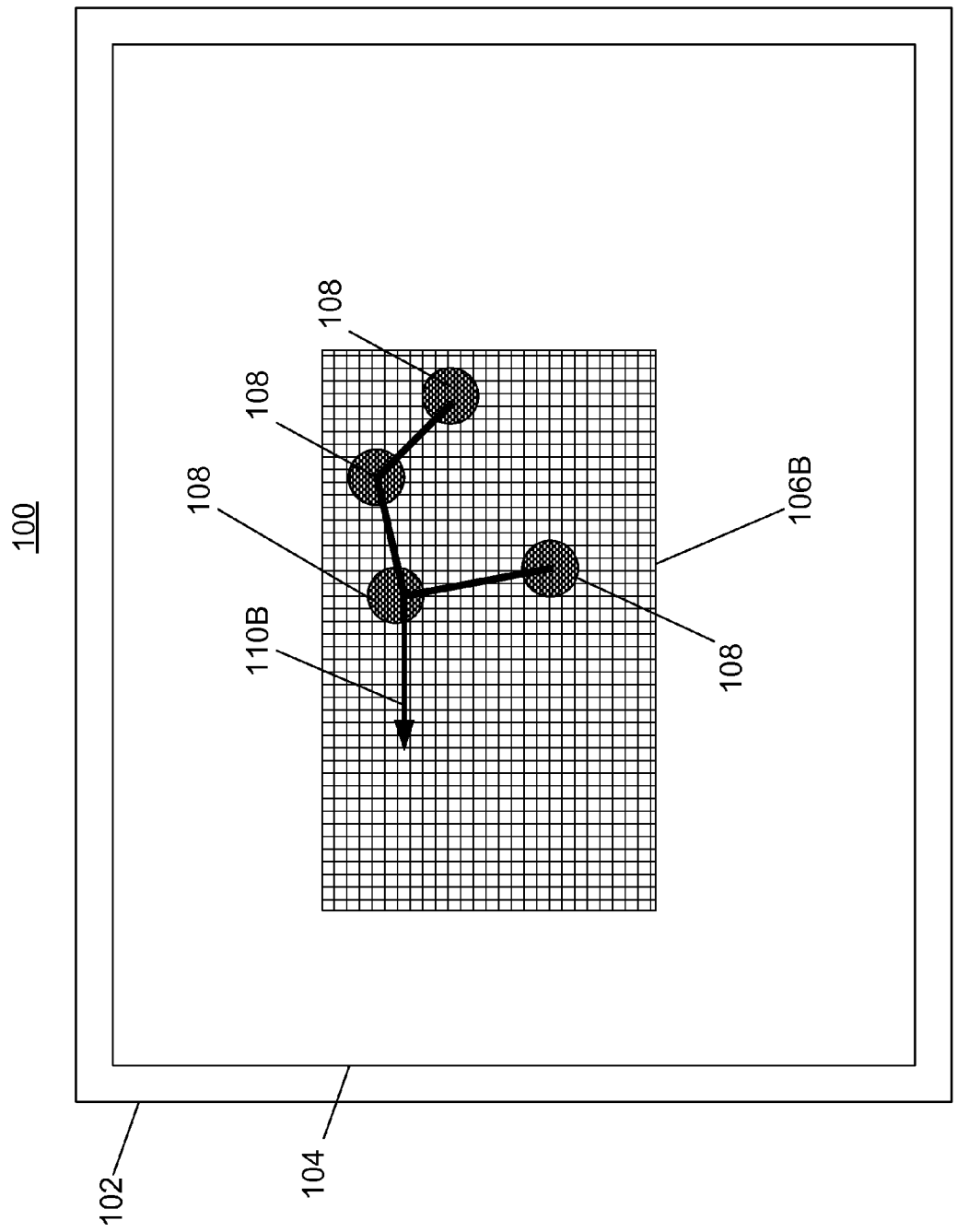

FIG. 1B illustrates an example of the window 106A that has been increased in size to form window 106B. In the example illustrated in FIG. 1B, a second gesture 110B can cause the window 106B to be further expanded in size, for example, along the left edge (corresponding to the direction of the second gesture 110B).

In other implementations, gestures in other directions (e.g., in a downward or upward direction) can cause the window 106B to behave differently. By way of example, after multi-touch selection of a particular window, a downward gesture can cause the window to be minimized. Furthermore, an upward gesture can cause a selected window to be maximized.

Figure 1C:
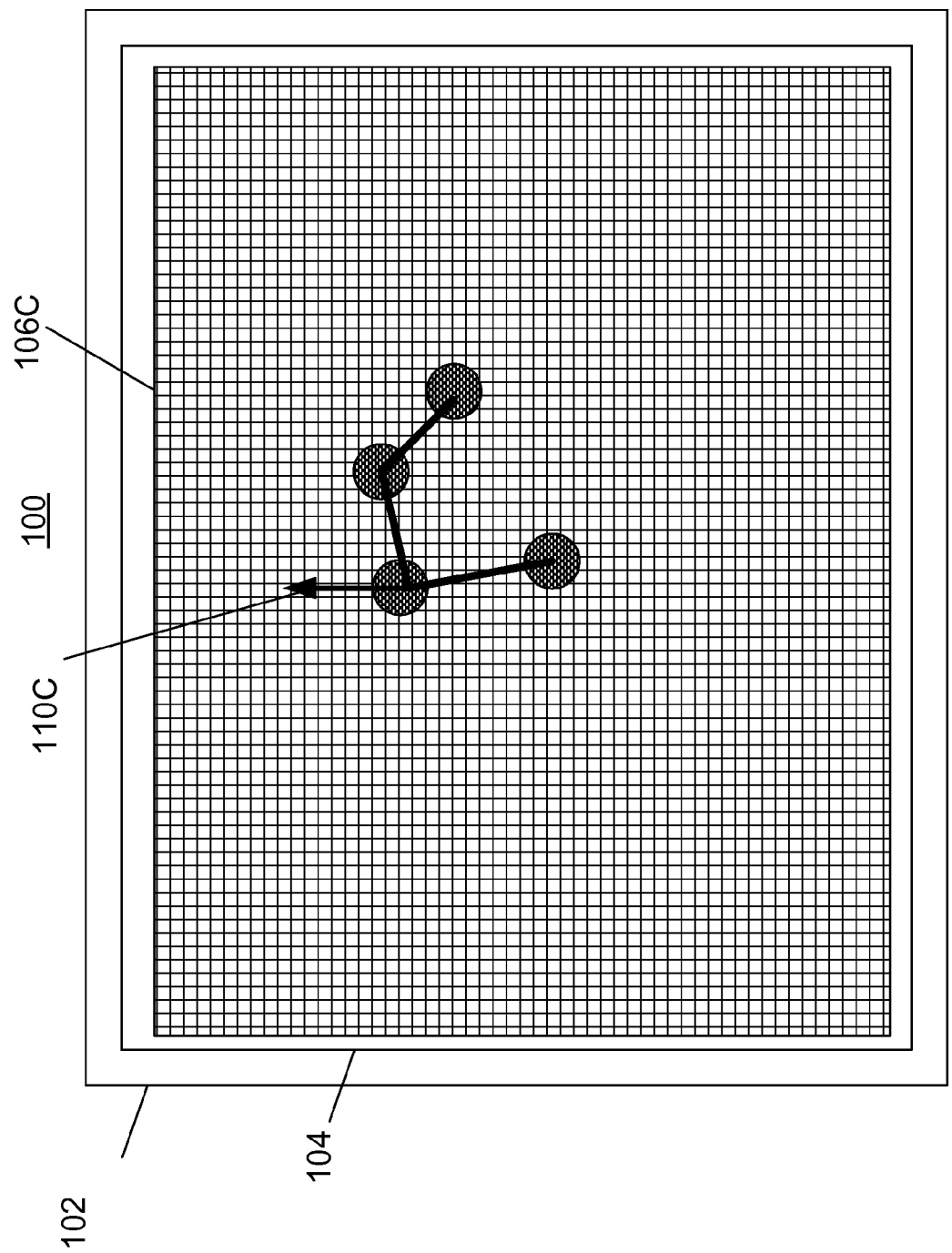

FIG. 1C illustrates an example of a window 106C displayed on the touch-based display 104 that has been maximized based on an upward gesture 110C received by the user. In other implementations, gestures received from the user can be interpreted by the window manager to cause other changes in the display of one or more windows.

Figure 1D:
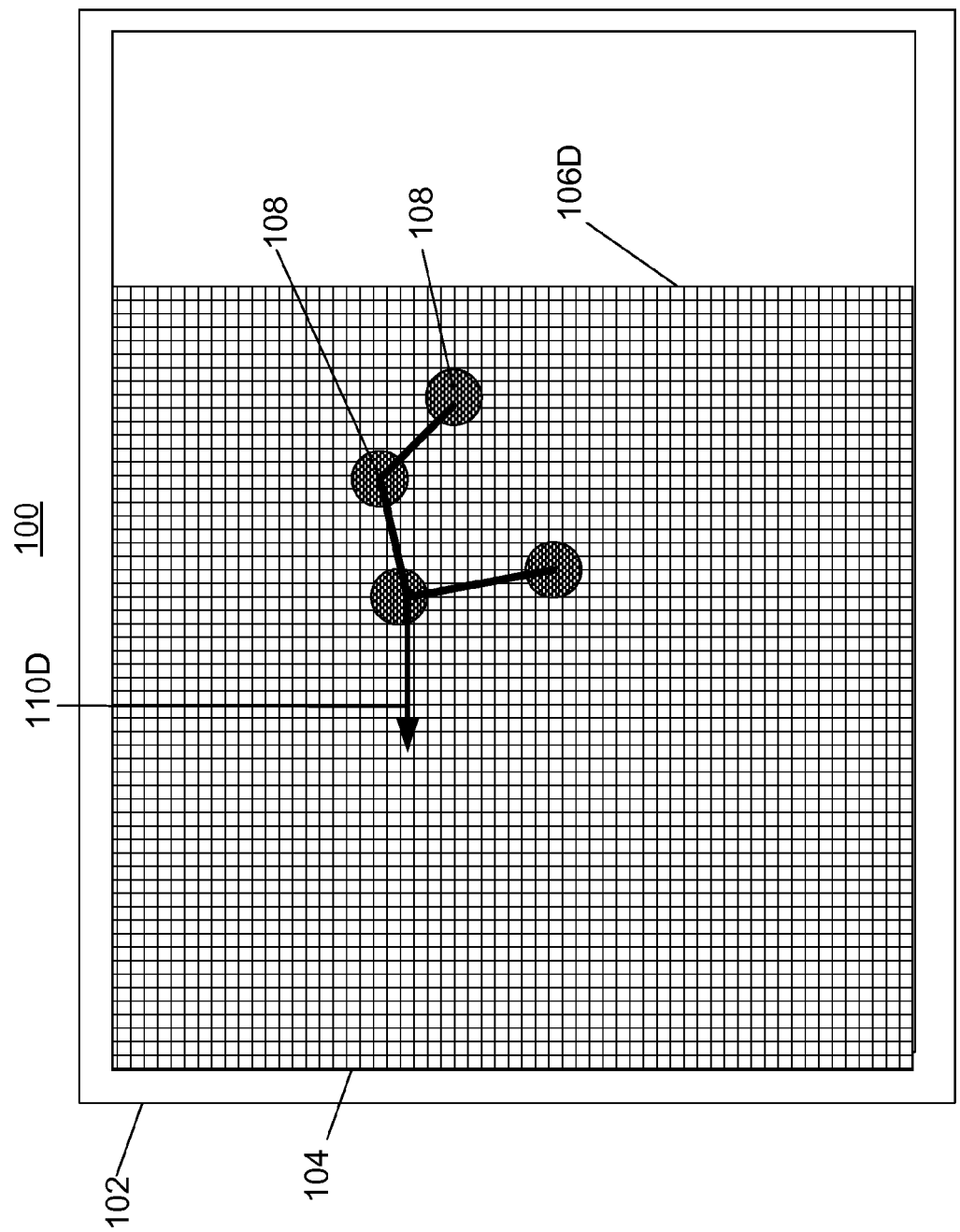

Gestures received via a user's multi-touch interaction can also cause a window to be docked along an edge of a display (e.g., along a particular edge of touch-based display 104). An example of window docking is illustrated in FIG. 1D, wherein left gesture 110D corresponds with docking of window 106D along the left edge of touch-based display 104. Although the example illustrated in FIG. 1D shows docking with respect to a left edge of touch-based display 104, docking be performed based on a direction of user gesture. As such, a right gesture can cause window 106D to be docked along a right edge of touch-based display 104.

Additionally, gestures received via a user's multi-touch interaction can cause a window to be either increased or decreased in size (e.g., expanded or contracted) along all edges of the window. FIG. 1E illustrates an example of a gesture for expanding the area of a selected window. Specifically, FIG. 1E illustrates gesture 110e in which the radial distance between contact points 108 is being increased (expanded) on touch-based display 104. As a result of gesture 110E, window 106E is expanded along all edges (as indicated by the dotted line). Similarly, in other aspects, a window may be compressed in size based on a user gesture. For example, a gesture in which the radial distance between contact points (e.g., contact points 108) is decreased.

Figure 2:
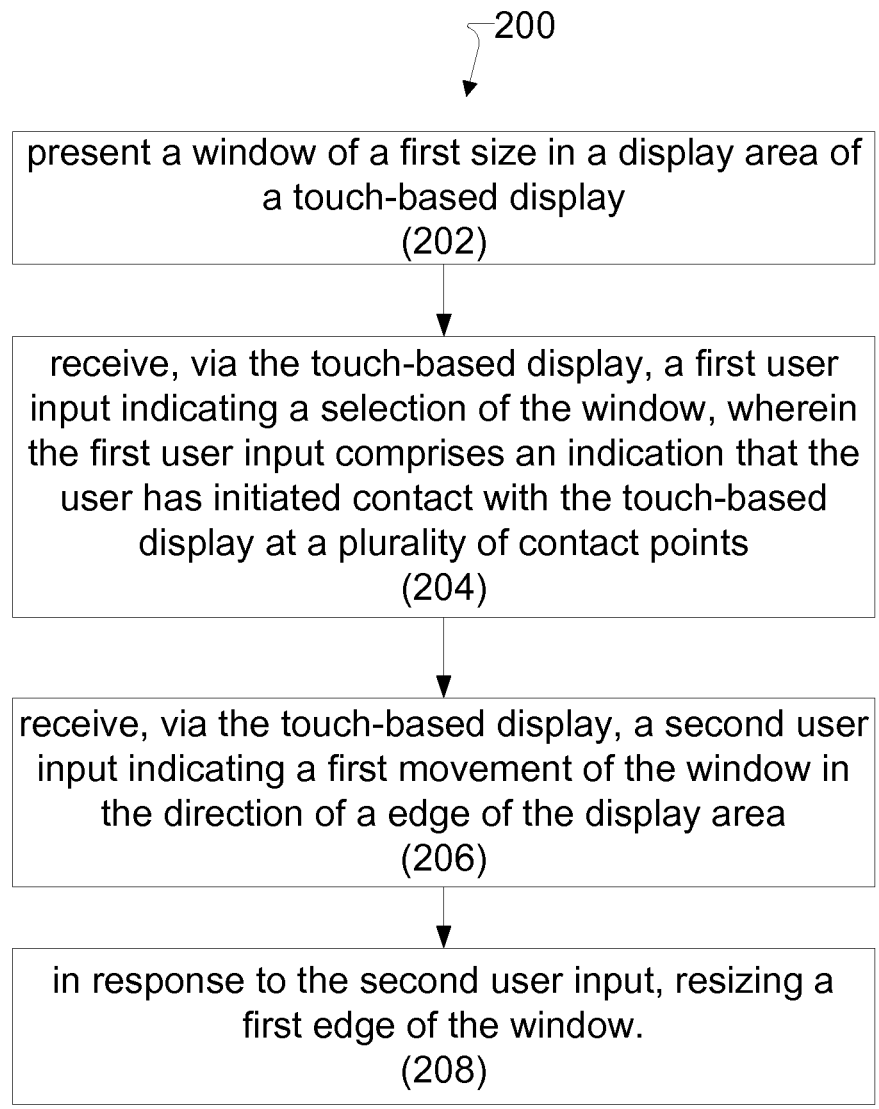
FIG. 2 illustrates an example of steps of a method for managing the display of one or more windows based on a user input, according to some aspects of the disclosure.

FIG. 2 illustrates an example of steps of a method 200 for managing the display of more windows in response to a user input. The method 200 begins with step 202, in which a window of a first size is presented in a display area of a touch-based display. The window having the first size can be presented alone, or may be presented together with one or more other windows in the display area on the touch-based display.

In step 204, a first user input is received, via the touch-based display, indicating a selection of the window, wherein the first user input comprises an indication that the user has initiated contact with the touch-based display at a plurality of contact points.

User interaction with the touch-based display will occur when the user touches the touch-based display at one or more points on the display surface. In some implementations, selection of one or more windows will be caused based on the number of contact points with which it is determined that the user is interacting with the touch-based display. By way of example, a threshold number of contact points (for example, four contact points) may be required to cause selection of a particular window and to ready a window manager for receipt of one or more subsequent user gestures. In some implementations, the user may contact the touch-based display using multiple fingers from a single hand or can interact with the touch-based display using one or more fingers from both hands.

Furthermore, in some implementations, selection of a particular window (e.g., from among a plurality of displayed windows) can be caused by interaction by the user with areas of the touch-based display corresponding to a display of the particular window to be selected. However, in certain aspects, selection of a particular widow can be performed without the need for the user to touch portions of the touch-based display corresponding with a particular area of the window display.

In step 206, a second user input is received, via the touch-based display, indicating a first movement of the window in the direction of an edge of the display area. The second user input (e.g., a gesture made by the user with his/her fingers on the touch-based display) can be made in any direction with respect to the touch-based display. Furthermore, the second user input or gesture may occur at varying speeds, for example, as the user slides or "flicks" his/her fingers across a surface of the touch-based display.

In step 208, the first edge of the window is resized in response to the second user input. The window can be resized in any manner, in response to the second input. By way of example, if the user gestures in a left direction with respect to the touch-based display, a left edge of the selected window can be increased in size to increase a total area of the selected window. Conversely, if the user gestures in a right direction with respect to the touch-based display, a right edge of the selected window may be increased in size. As will be explained in further detail below, gestures in other direction can cause other movement and/or display behavior in one or more selected windows.

Figure 3:
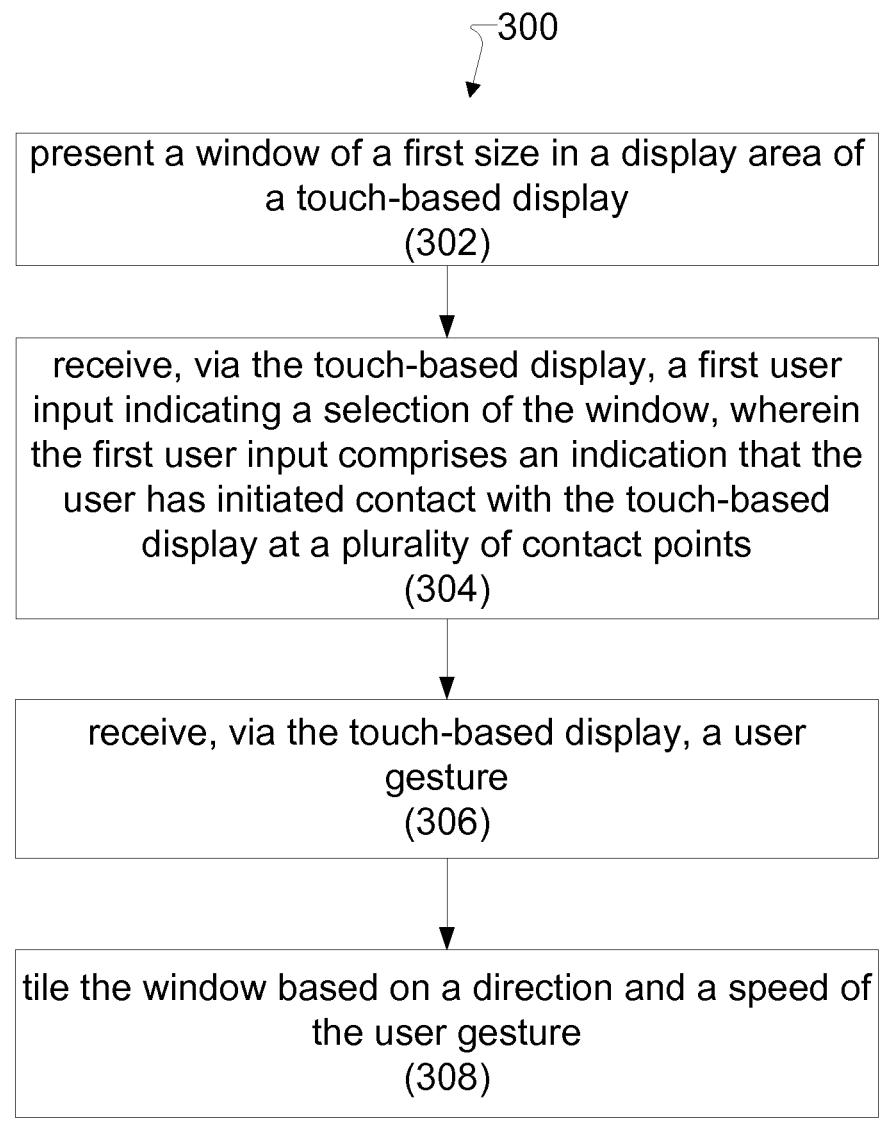
FIG. 3 illustrates an example of steps of a method for managing the display of one more windows in response to a user gesture, according to some aspects of the disclosure.

FIG. 3 illustrates an example of steps of a method 300 for managing the display of one or more windows in response to a user gesture. The method 300 begins with step 302 in which a window of a first size is presented in a display area of a touch-based display. As in the example in the method 200, the window of the first size can be presented alone, or may be presented together with one or more other windows in the display area on the touch-based display.

In step 304, a first user input is received, via the touch-based display, indicating a selection of the window, wherein the first user input comprises an indication that the user has initiated contact with the touch-based display at a plurality of contact points.

As discussed above, the user's interaction (e.g., multi-touch interaction) with the touch-based display can occur in the context of single handed, or dual handed use. In certain implementations, a threshold number of discrete contact points (e.g., between the user and the touch-based display) may be required before selection of the window is initiated.

In some implementations, a threshold number of contact points between the user and the touch-based display may trigger selection of one or more windows from among a plurality of windows.

In step 306, a user gesture is received, via the touch-based display. The user gesture can comprise any movement or gesture made by the user on the touch-based display. For example, the user gesture may comprise a flicking gesture made in a direction of a particular edge of the touch-based display.

In step 308, the window is tiled based on a direction and a speed of the user gesture. In practice, the user may flick his/her fingers slowly in an upward direction on the touch-based display. As a result, the window may be displayed as sliding, at a relatively slow speed, in an upward direction. In another aspect, if the user makes a fast gesture, again in the upward direction, the window may slide (quickly) in the upward direction, before reaching an upper edge of the display area, at which point the window can be maximized.

In another aspect, a user gesture in a downward direction can cause the window to be minimized and/or can cause the window to be reduced in size (e.g., "tiled") to a predetermined faction of a maximum possible window size.

Figure 4:
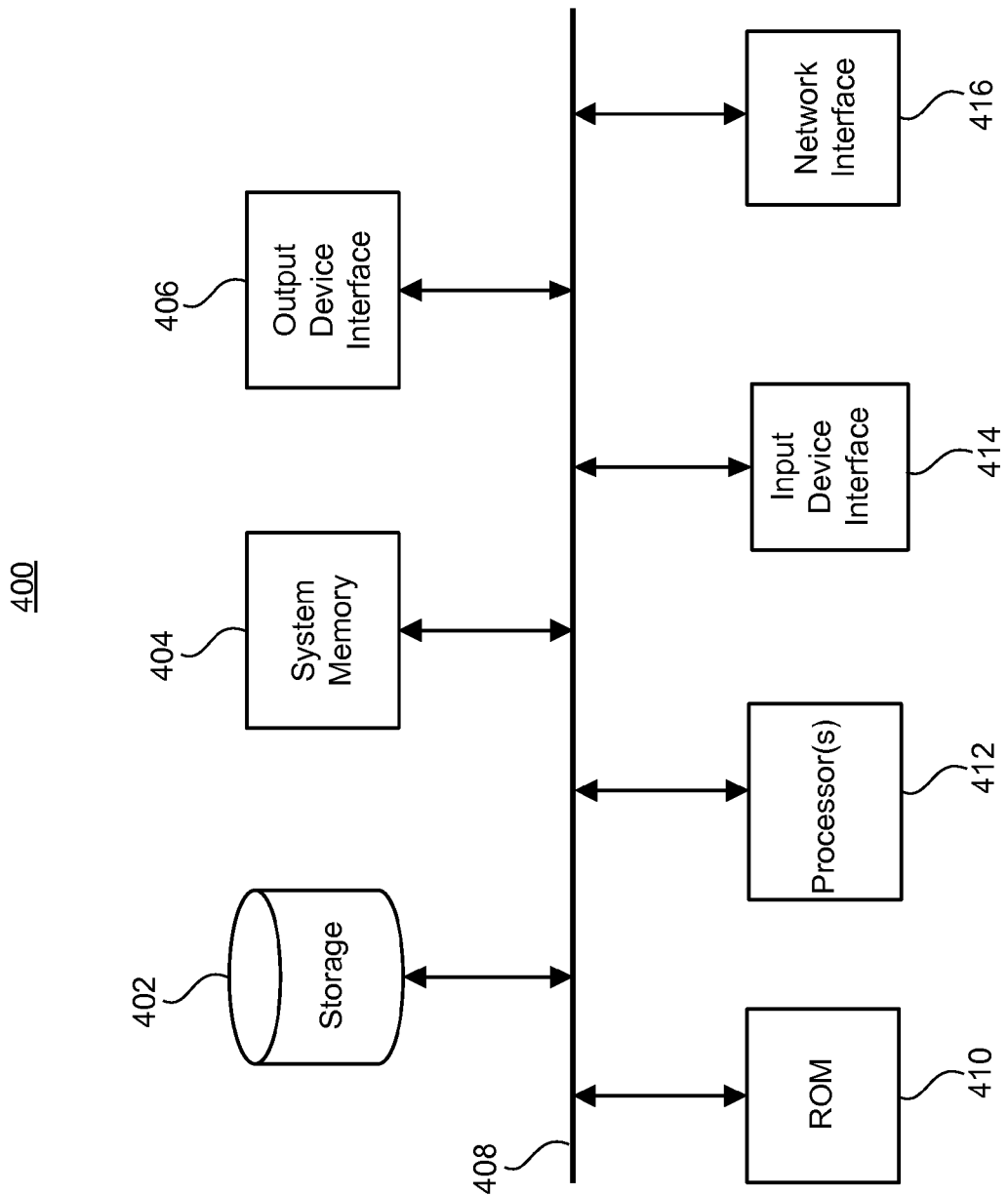
FIG. 4 illustrates an example of a computing-device that can be used to implement some aspects of the disclosure.

FIG. 4 illustrates an example of a computing-device that can be used to implement some aspects of the subject disclosure.

As illustrated, the computing device 400 comprises storage 402, a system memory 404, an output device interface 406, system bus 408, ROM 410, one or more processor(s) 412, input device interface 414 and a network interface 416. In some aspects, the system bus 408 collectively represents all system, peripheral, and chipset buses that communicatively connect the numerous internal devices of computing device 400. For instance, system bus 408 communicatively connects the processor(s) 412 with the ROM 410, the system memory 404, the output device interface 406 and the permanent storage device 402.

In some implementations, the various memory units, the processor(s) 412 retrieve instructions to execute (and data to process) in order to execute the steps of the subject technology. The processor(s) 412 can be a single processor or a multi-core processor in different implementations. Additionally, the processor(s) can comprise one or more graphics processing units (GPUs) and/or one or more decoders, depending on implementation.

The ROM 410 stores static data and instructions that are needed by the processor(s) 412 and other modules of the computing device 400. Similarly, the processor(s) 412 can comprise one or more memory locations such as a CPU cache or processor in memory (PIM), etc. The storage device 402, is a read-and-write memory device. In some aspects, this device can be a non-volatile memory unit that stores instructions and data even when the computing device 400 is without power. Some implementations of the subject disclosure can use a mass-storage device (such as solid state, magnetic or optical storage devices) e.g., a permanent storage device 402.

Other implementations can use one or more a removable storage devices (e.g., magnetic or solid state drives) such as permanent storage device 402. Although the system memory can be either volatile or non-volatile, in some examples the system memory 404 is a volatile read-and-write memory, such as a random access memory. System memory 404 can store some of the instructions and data that the processor needs at runtime.

In some implementations, the processes of the subject disclosure are stored in system memory 404, permanent storage device 402, ROM 410 and/or one or more memory locations embedded with the processor(s) 412. From these various memory units, processor(s) 412 retrieve instructions to execute and data to process in order to execute the processes of some implementations of the instant disclosure.

The bus 408 also connects to the input device interface 414 and output device interface 406. The input device interface 414 enables a user to communicate information and select commands to the computing device 400. Input devices used with the input device interface 414 may include for example, alphanumeric keyboards and pointing devices (also called "cursor control devices") and/or wireless devices such as wireless keyboards, wireless pointing devices, etc.

In some implementations, the input device interface 414 could provide coupling to a display device, such as the touch-based display 104, discussed above with respect to FIGS. 1A-1C. As such, the input device interface 414 can be used to receive touch-based gestures or commands from a user, for example, to facilitate multi-touch interaction with a window manager of the computing device 400.

Finally, as shown in FIG. 4, bus 408 also communicatively couples the computing device 400 to a network (not shown) through a network interface 416. It should be understood that the network interface 416 can be either wired, optical or wireless and may comprise one or more antennas and transceivers. In this manner, the computing device 400 can be a part of a network of computers, such as a local area network ("LAN"), a wide area network ("WAN"), or a network of networks, such as the Internet.

In practice, the methods of the subject technology can be carried out by the computing device 400. In some aspects, instructions for performing one or more of the method steps of the present disclosure will be stored on one or more memory devices such as the storage 402 and/or the system memory 404.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more computing systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A computer-implemented method for tiling a window, the method comprising:
    presenting a window of a first size in a display area of a touch-based display;
    receiving, via the touch-based display, a first user input indicating a selection of the window, wherein the first user input comprises an indication that the user has initiated contact with the touch-based display at two or more contact points for selection of the window;
    receiving, via the touch-based display, a second user input indicating a first movement of the window in a direction of a first edge of the display area and at a speed; and
    in response to the direction and the speed of the second user input:
        if the speed of the second user input is slower than or equal to a first threshold speed, moving the window in the direction of the first edge of the display area; and
        if the speed of the second user input is faster than a second threshold speed, resizing the window.

2. The method of claim 1, further comprising:
    receiving, via the touch-based display, a third user input indicating a second movement of the window in a direction of a second edge of the display area; and
    in response to the third user input, resizing the window.

3. The method of claim 1, wherein the indication that the user has initiated contact with the touch-based display at the two or more contact points is based on the user's interaction with the touch-based display using two or more fingers.

4. The method of claim 1, wherein the indication that the user has initiated contact with the touch-based display at the two or more contact points, is based on the user's interaction with the touch-based display using two or more hands.

5. The method of claim 1, wherein resizing the window comprises:
    aligning a first edge of the window with a grid overlaid upon the display area; and
    snapping the window to the grid.

6. A system for tiling a window, the system comprising:
    one or more processors;
    a touch-based display coupled to the one or more processors; and
    a computer-readable medium comprising instructions stored therein, which when executed by the processors, cause the processors to perform operations comprising:
        presenting a window of a first size in a display area of a touch-based display;
        receiving, via the touch-based display, a first user input indicating a selection of the window, wherein the first user input comprises an indication that the user has initiated contact with the touch-based display at two or more contact points for selection of the window;
        receiving, via the touch-based display, a second user input indicating a first movement of the window in a direction of a first edge of the display area and at a speed; and
        in response to the direction and the speed of the second user input:
            if the speed of the second user input is slower than or equal to a first threshold speed, moving the window in the direction of the first edge of the display area; and
            if the speed of the second user input is faster than a second threshold speed, resizing the window.

7. The system of claim 6, further comprising:
receiving, via the touch-based display, a third user input indicating a second movement of the window in a direction of a second edge of the display area; and
in response to the third user input, resizing the window.

8. The system of claim 6, wherein the indication that the user has initiated contact with the touch-based display at the two or more contact points, is based on the user's interaction with the touch-based display using two or more hands.

9. The system of claim 6, wherein resizing the window comprises:
aligning a first edge of the window with a grid overlaid upon the display area; and
snapping the window to the grid.

10. A computer-readable medium comprising instructions stored therein, which when executed by a processor, cause the processor to perform operations comprising:
presenting a window of a first size in a display area of a touch-based display;
receiving, via the touch-based display, a first user input indicating a selection of the window, wherein the first user input comprises an indication that the user has initiated contact with the touch-based display at two or more contact points for selection of the window;
receiving, via the touch-based display, a second user input indicating a first movement of the window in a direction of a first edge of the display area and at a speed; and
in response to the direction and the speed of the second user input:
if the speed of the second user input is slower than or equal to a first threshold speed, moving the window in the direction of the first edge of the display area; and
if the speed of the second user input is faster than a second threshold speed, resizing the window.

11. The computer-readable medium of claim 10, further comprising:
receiving, via the touch-based display, a third user input indicating a second movement of the window in a direction of a second edge of the display area; and
in response to the third user input, resizing the window.

12. The computer-readable medium of claim 10, wherein the indication that the user has initiated contact with the touch-based display at the two or more contact points is based on the user's interaction with the touch-based display using two or more fingers.

13. The computer-readable medium of claim 10, wherein the indication that the user has initiated contact with the touch-based display at the two or more contact points, is based on the user's interaction with the touch-based display using two or more hands.

14. The computer-readable medium of claim 10, wherein resizing the window comprises:
aligning a first edge of the window with a grid overlaid upon the display area; and
snapping the window to the grid.

15. A computer-readable medium comprising instructions stored therein, which when executed by a processor, cause the processor to perform operations comprising:
presenting a window of a first size in a display area of a touch-based display;
receiving, via the touch-based display, a first user input indicating a selection of the window, wherein the first user input comprises an indication that the user has initiated contact with the touch-based display at two or more contact points;
receiving, via the touch-based display, a user gesture; and
based on both a direction and a speed of the user gesture:
if the speed of the user gesture is slower than or equal to a first threshold speed, moving the window in the direction of the user gesture at a first slower speed; and
if the speed of the user gesture is faster than a second threshold speed, sliding the window in the direction of the user gesture at a second faster speed and resizing the window upon the window reaching an edge of the display area.

16. The computer-readable medium of claim 15, wherein the indication that the user has initiated contact with the touch-based display at the two or more contact points is based on the user's interaction with the touch-based display using two or more fingers.

17. A computer-readable medium comprising instructions stored therein, which when executed by a processor, cause the processor to perform operations comprising:
presenting a window of a first size in a display area of a touch-based display;
receiving, via the touch-based display, a first user input indicating a selection of the window, wherein the first user input comprises an indication that the user has initiated contact with the touch-based display at two or more contact points;
receiving, via the touch-based display, a second user input indicating a first movement of the window at a speed and in a direction of a first edge of the display area; and
in response to the direction and the speed of the second user input:
if the speed of the second user input is slower than or equal to a first threshold speed, moving the window in the direction of the first edge of the display area; and
if the speed of the second user input is faster than a second threshold speed, minimizing the window in response to the second user input.

18. The computer-readable medium of claim 17, wherein the indication that the user has initiated contact with the touch-based display at the two or more contact points is based on the user's interaction with the touch-based display using two or more hands.

19. A computer-readable medium comprising instructions stored therein, which when executed by a processor, cause the processor to perform operations comprising:
presenting a plurality of windows in a display area of a touch-based display;
receiving, via the touch-based display, a first user input indicating a selection of a first window, wherein the first user input comprises an indication that the user has initiated contact with the touch-based display at two or more contact points;
receiving, via the touch-based display, a second user input indicating a first movement of the first window at a speed and in a direction of a first edge of the display area;
if the speed of the second user input is slower than or equal to a first threshold speed, moving the window in the direction of the first edge of the display area; and
if the speed of the second user input is faster than a second threshold speed, maximizing the first window in response to the second user input, wherein the window maximizes upon reaching the first edge of the display area.

20. The computer-readable medium of claim 19, wherein the indication that the user has initiated contact with the touch-based display at the two or more contact points is based on the user's interaction with the touch-based display using two or more hands.

21. The method of claim 1, wherein the first and second threshold speeds are the same.

* * * * *